United States Patent [19]
Beyer et al.

[11] 3,731,487
[45] May 8, 1973

[54] MASTER CYLINDER

[75] Inventors: Norman H. Beyer, Royal Oak; Joseph Zuk, Hamtramck, both of Mich.

[73] Assignee: Chrysler Corporation, Highland Park, Mich.

[22] Filed: Aug. 23, 1971

[21] Appl. No.: 174,251

Related U.S. Application Data

[63] Continuation-in-part of Ser. No. 33,994, May 4, 1970, abandoned.

[52] U.S. Cl. ............................................. 60/54.6 E
[51] Int. Cl. ............................................. F15b 7/00
[58] Field of Search .................. 60/54.6 E; 188/345

[56] References Cited

UNITED STATES PATENTS

| | | | |
|---|---|---|---|
| 3,210,942 | 10/1965 | Chowings | 188/345 |
| 3,478,517 | 11/1969 | Shellhause | 60/54.6 E |
| 3,191,385 | 6/1965 | Watanabe | 188/345 |
| 3,423,939 | 1/1969 | Lewis et al. | 60/54.6 E |
| 3,403,517 | 10/1968 | Lewis | 60/54.6 E |
| 3,412,556 | 11/1968 | Rike et al. | 60/54.6 E |
| 3,421,322 | 1/1969 | Reznicek | 60/54.6 E |
| 3,423,940 | 1/1969 | Brand | 60/54.6 E |
| 3,068,651 | 12/1962 | Shutt | 60/54.6 E |
| 3,513,655 | 5/1970 | Reznicek | 60/54.6 E |
| 3,393,514 | 7/1968 | Cripe | 60/54.6 E |

FOREIGN PATENTS OR APPLICATIONS

| | | | |
|---|---|---|---|
| 977,268 | 12/1964 | Great Britain | 60/54.6 E |
| 693,132 | 8/1964 | Canada | 60/54.6 E |

*Primary Examiner*—Martin P. Schwadron
*Assistant Examiner*—A. M. Zupcic
*Attorney*—Talburtt & Baldwin

[57] ABSTRACT

Master cylinder for automotive hydraulic brake system. Two pistons are slideable in a bore in a cylinder body and provide two chambers which communicate with front and rear brake circuits. Two stops are provided for limiting the outward movement of the pistons.

1 Claim, 4 Drawing Figures

Patented May 8, 1973

INVENTORS.
Norman H. Beyer
Joseph Zuk
BY
Talbutt & Baldwin,
ATTORNEYS.

Patented May 8, 1973
3,731,487
2 Sheets-Sheet 2
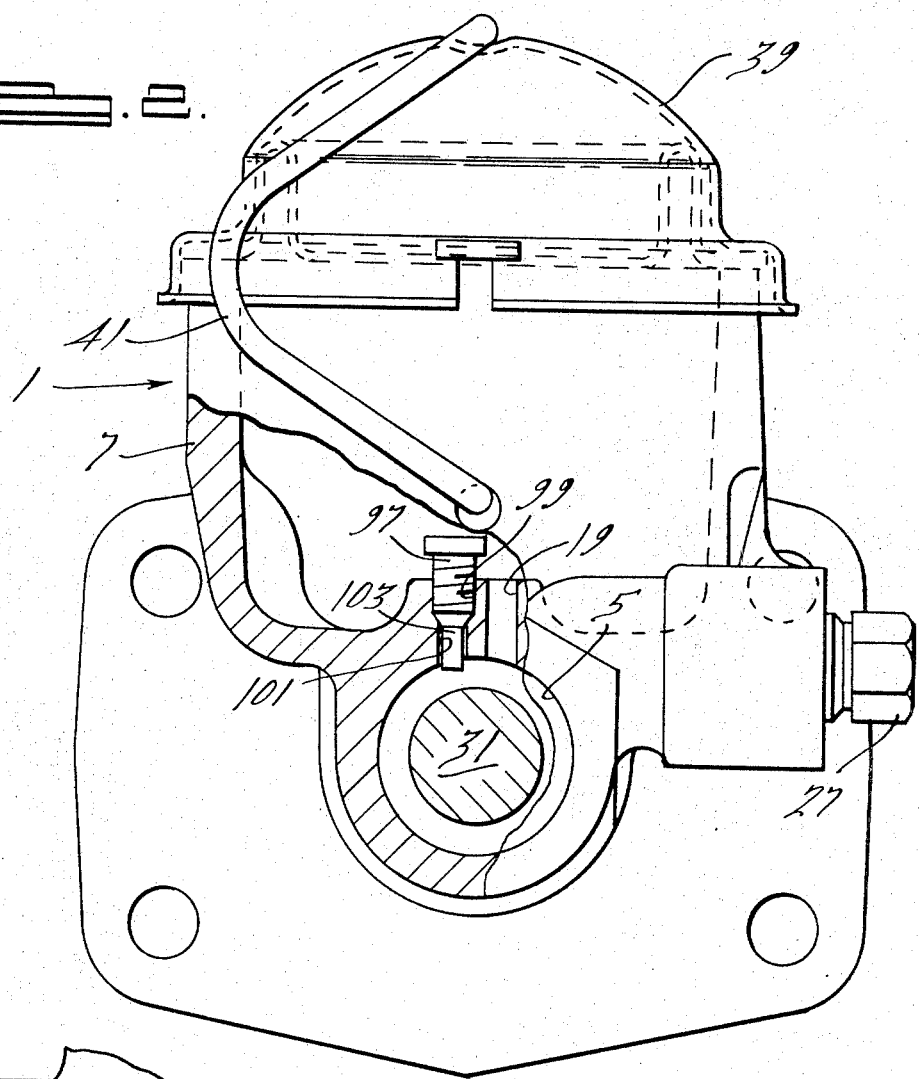
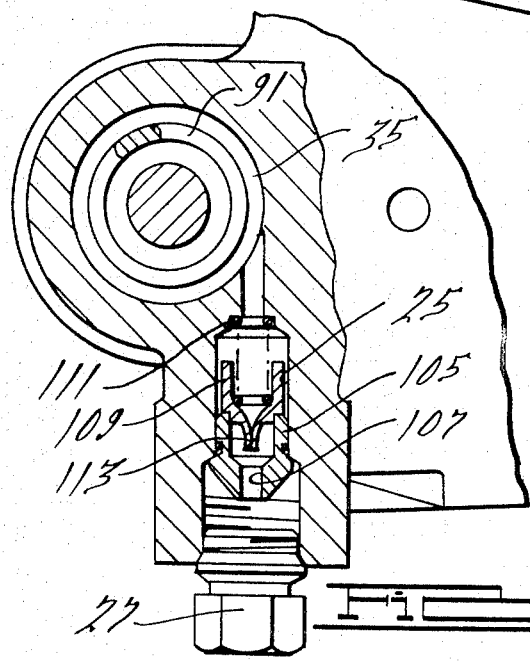
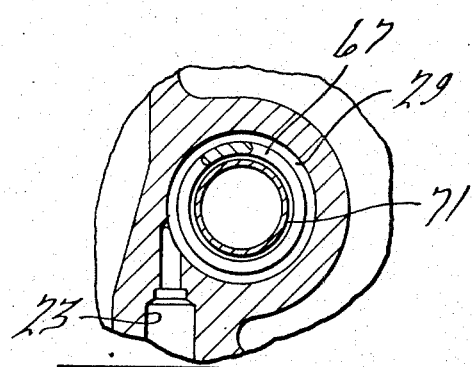
INVENTORS
Norman H. Beyer
Joseph Zuk
BY Talbott & Baldwin,
ATTORNEYS

MASTER CYLINDER

This application is a continuation-in-part of U. S. application Ser. No. 33,994, filed May 4, 1970, now abandoned.

BACKGROUND OF THE INVENTION

This invention relates to improvements in brakes, and their operation, and more particularly to a master cylinder for the hydraulic brake for motor vehicles.

One type of master cylinder and the type to which this invention relates, is commonly referred to as a split system or tandem master cylinder. Such a master cylinder has distinct and separate connections to the rear wheel brakes and to the front wheel brakes. Thus, if one set of brakes, either the front or rear set, malfunctions in such a way that a hydraulic pressure failure occurs in that set of brakes, the other set of brakes will continue to operate. This, of course, provides for greater safety in the operation of the vehicle.

The present invention is directed to an improvement in the above described type of brakes.

BRIEF SUMMARY OF THE INVENTION

Briefly, this invention relates to a hydraulic brake master cylinder in which two piston stops are provided, one of the stops being free of any significant sealing means, and in which certain parts may be common to several different brakes.

One of the primary objects of this invention is to provide a master cylinder such as described in which leakage of hydraulic fluid is inhibited.

A further object of this invention is to provide a master cylinder of the class described in which certain parts may be used in several different master cylinders.

Another object of this invention is to provide a master cylinder of the type described in which one of the pistons thereof may be used in many different master cylinders in which different piston strokes are required.

Another object of this invention is to provide a master cylinder of the type described which insures that each of two piston members will be stopped, even if a hydraulic failure occurs in one of the hydraulic lines.

A further object of this invention is to provide a master cylinder of the tandem type which eliminates a sealing problem heretofore existing in many master cylinders.

Another object of this invention is to provide a master cylinder such as described which is economical in construction and efficient in operation.

Other objects and advantages of this invention will be made apparent as the description progresses.

BRIEF DESCRIPTION OF THE DRAWINGS

Referring now to the drawings, in which one of various possible embodiments of this invention is illustrated.

FIG. 2 is an end elevation taken from the left-hand end of FIG. 1, certain parts being broken away and other parts being shown in section for clarity; and FIGS. 3 and 4 are sections taken along lines 3—3 and 4—4, respectively, of FIG. 1.

Like parts are indicated by corresponding reference characters throughout the several views of the drawings.

DESCRIPTION OF THE PREFERRED EMBODIMENT

Figure 1:
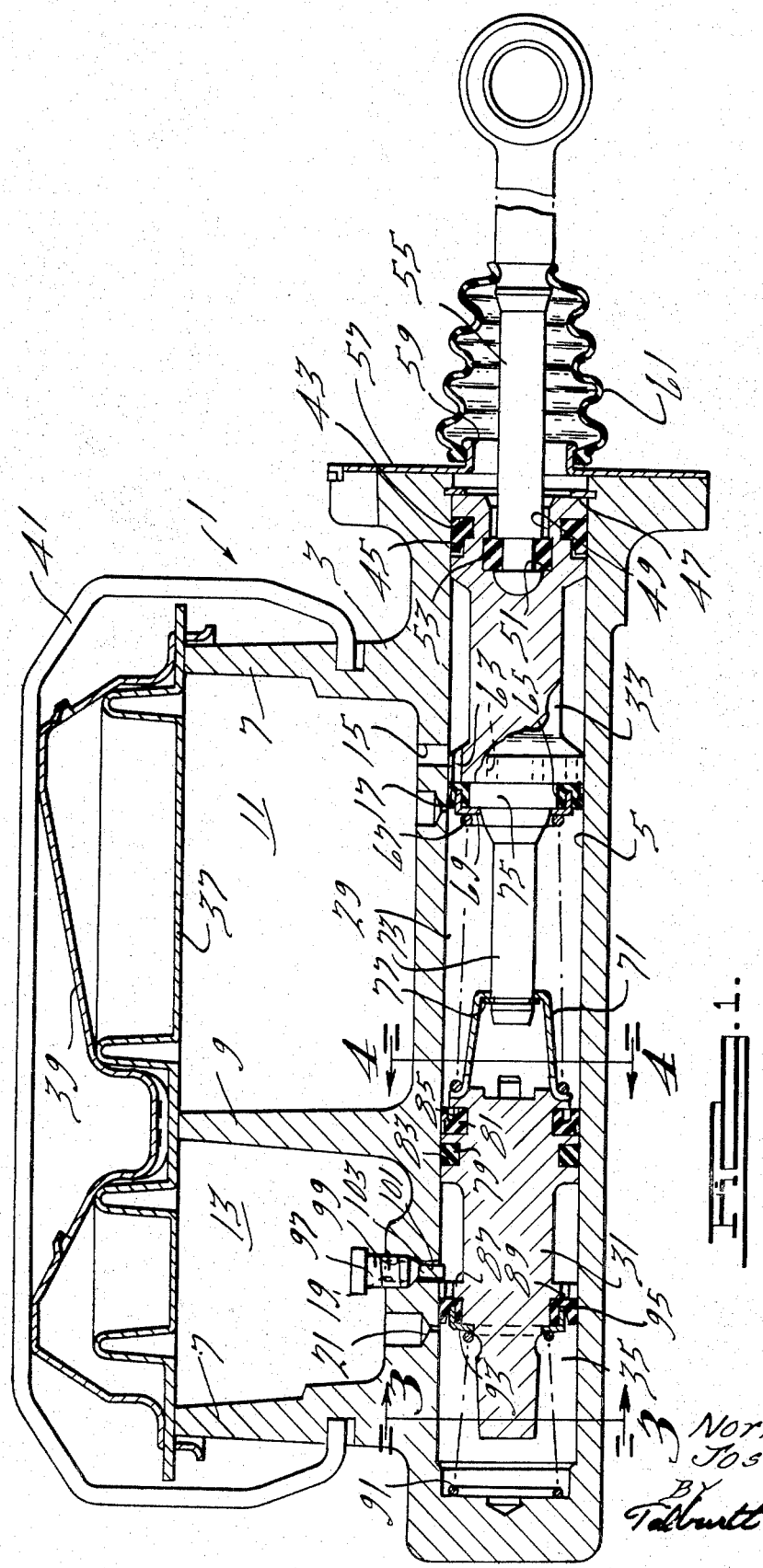
FIG. 1 is a sectional view of a master cylinder of this invention.

Referring now to the drawings, a master cylinder of this invention is shown generally at 1 in FIG. 1. The master cylinder comprises a housing or casting 3 having an elongated bore 5 therein. Upwardly extending walls 7 and 9 provide two reservoirs 11 and 13 of hydraulic fluid. The reservoir 11 has a filler hole 15 and a compensating port 17 opening into the bore 5. Similarly, reservoir 13 has a filler hole 19 (FIG. 2) and a compensating port 21 opening into the bore 5.

Two outlets or discharge openings 23 and 25 are provided in the casting. The outlet 23 provides for communication between a one hydraulic circuit such as the front wheel braking hydraulic circuit (not shown) and a chamber 29 formed between two pistons 31 and 33 in bore 5. Outlet 25 is adapted to place the other hydraulic brake circuit, such as the rear wheel hydraulic circuit 27, in communication with a chamber 35 formed between piston 31 and the end of bore 5.

A diaphragm 37 extends across the upper ends of walls 7 and 9 to close reservoirs 11 and 13. The diaphragm is secured by a cover 39 and a bail 41.

Piston 33, which may be referred to as the primary piston, has an annular recess 43 adjacent one end thereof in which an annular seal 45 is seated. A snap ring stop 47 is provided adjacent the outer end of bore 5 to prevent inadvertent removal of piston 33. The outer end of piston 33 has a bore 49 with an annular groove 51 therein in which a ring 53 on the end of a push rod 55 is located. As will be understood, the push rod 55 may be connected to a foot operated lever (not shown).

An abutment 57 for the push rod has an annular flange 59 and a boot 61 of flexible material which embraces the flange and rod 55 to form a seal for the recessed end of the piston 33.

The other end of primary piston 33 has axially extending holes 63 therein which are sealed by a seal 65 biased against the front face of the piston by a coil spring 67.

Spring 67 extends and is caged between a radially extending flange on an annular ring 69 on which seal member 65 is mounted and flanges on a cup-shaped member 71. A connecting rod 73 having an enlarged head 75 on one end and a snap ring 77 on the other completes the caging of spring 67.

Piston 31 is provided with two seals 79 and 81 in annular grooves 83 and 85, respectively. Spaced from seal 79 is an annular flange 87 having axially extending holes 89 therein. The piston 31 is biased away from the end of bore 5 by a spring 91 which engages the end of the bore and the radially directed flange of a ring 93 located in a groove of a seal 95.

A stop screw 97 is threaded into the counterbored portion 99 of a bore 101. The screw 97 has a shank portion 103 of reduced diameter which extends through bore 101 into bore 5 to provide a safety stop for piston 31, the shoulder between shank portion 103 and the threaded portion of screw 97 seating on the shoulder between counterbore 99 and bore 101 to positively locate the end of the shank 103 in the correct blocking position. The screw may be tightened down until the shoulders engage, thereby eliminating any careful adjustment of the screw. Since the stop screw extends from reservoir 13 into bore 5 it is unnecessary to provide any significant sealing means for preventing the loss of fluid from bore 5.

A ferrule 105 is seated in each outlet 23 and 25 and has an opening 107 therethrough. An elastomeric valve member 109 is biased toward the inner end of ferrule 105 by a spring 111. Valve member 109 has a slit 113 in the duckbill end thereof. It will be seen that when the pressure upstream of the valve member is greater than downstream thereof the slit 113 will open to permit the hydraulic fluid to flow through the valve. The pressure of fluid downstream of the valve must be sufficiently greater than the upstream pressure to overcome the force exerted on the valve member by the spring 111 and cause the valve member to unseat, thereby permitting fluid to flow around the valve member. This will occur when the brakes are released and the pressure in the wheel cylinder, due to the return thereof to normal position, is greater than the pressure upstream of the valve member.

Brakes of different sizes and for different vehicles obviously require different brake shoe components. Some brakes have thicker shoes than others, and the diameters of the drums may be different for different brake systems. As the shoes wear the pistons in the master cylinder take longer strokes for applying the shoes. In view of the differences in drum diameters, etc., between different brakes, some means must be provided for adapting a particular master cylinder to a particular brake. This is often accomplished by providing different pistons for each different brake assembly. This can result in the use of a relatively large number of different parts, such as pistons, to produce different brakes. The present invention allows one piston, namely piston 33, to be used for several different brakes.

In particular, the design of the master cylinder is such that piston 33 within the bore 5 may be used in several different master cylinders in which different amounts of movement are desired between the end of rod 73 and piston 31, i.e., different strokes are required for the front wheel piston 33. To modify the apparatus shown in the drawings so that piston 33 and rod 73 are adapted to have a longer stroke before the rod engages piston 31 it is only necessary to bore a hole in the end of piston 31 to the desired depth. This hole would be aligned with the rod 73 as the latter moves toward the piston 31. Thus, it is not necessary to provide rods 73 of various lengths, or cups 71 of various depths, or adjustable threaded rods 73, or different pistons 33 to adapt the master cylinder to meet different stroke requirements for different brake sizes and vehicles. This reduction in the number of different parts is not only a cost savings, but also helps prevent inadvertent assembly of mismatched components.

Assuming the parts are in the position shown in FIG. 1, operation of the apparatus is as follows:

The rod 55 is moved to the left by the brake mechanism (not shown). This causes seal 65 to close compensating port 17 and, due to the stiffness of spring 67, piston 31 is also moved to the left. Pressure in chambers 29 and 35 is increased and such pressure is transferred to the front and rear rakes, respectively.

As the shoes on the front wheel brakes wear, it is necessary to displace more fluid from the chamber 29 to apply the shoes. Accordingly, the piston 33 is moved further to the left when actuated. As mentioned previously, by varying the depth of the recess in the right end of piston 31, applicants can allow for various amounts of maximum movement of piston 33, thus allowing such piston to be used in several master cylinder combinations.

If the rear brake hydraulic circuit has a failure therein, braking pressure will not be developed in chamber 35. Therefore, the spring 67 will cause the piston 31 to be moved until spring 91 bottoms or the left end of the piston engages the end of bore 5. The piston 33 will then move leftwardly toward piston 31 to increase the pressure in chamber 29 and the front brake hydraulic circuit. Similarly, if a hydraulic failure occurs in the front brake hydraulic circuit the piston 31 will still be moved to the left due to the caged spring connection 67 between the piston 33 and the piston 31 and upon compression of such spring, due to the engagement of rod 73 with piston 31. Accordingly, the front brakes would be applied.

When the pressure on the brake pedal is released, the spring 91 and the spring 67 move the piston 31 and 33 back toward the stops 97 and 47. It will be seen that if the stop 47 has failed or is otherwise incapacitated for any reason, the stop 97 will prevent the force applied by spring 91 and the force applied by any residual pressure in the front brake lines from moving the piston 31 out of the bore or to any position substantially beyond its normal position. Moreover, since the stop 97 opens into reservoir 13 there is no need to provide any significant sealing means in the bore 101 and counterbore 99.

In view of the foregoing it will be seen that the several objects and other advantages of this invention are achieved.

Although only one embodiment of the invention has been disclosed and described, it is apparent that other embodiments and modifications of the invention are possible.

We claim:

1. A master cylinder comprising a body having a first reservoir and a second reservoir, a bore extending through said body adjacent said reservoirs, a first piston movable in said bore, a second piston movable in said bore, the space between said first piston and second piston defining a first chamber, the space between the second piston and the end of the bore defining a second chamber, said body having outlets from said chambers adapted to be connected to hydraulic lines attached to front and rear sets of brakes, ports normally connecting said chambers to said reservoirs, an actuating rod means extending from one end of said first piston outwardly from said bore, connecting rod means extending from the other end of said first piston toward said second piston, said connecting rod means having an enlarged head portion, an annular ring-shaped member having an internal dimension smaller than the diameter of said enlarged head portion, the ring-shaped member being between said enlarged head and said second piston, a ring-shaped seal surrounding said enlarged head portion and engaging said ring-shaped member and said bore, a cup-shaped retainer slideably connected to said connecting rod, said cup-shaped retainer having a bottom and a side wall portion, a spring surrounding said rod and extending between said annular ring-shaped member and said retainer, said spring biasing said retainer and enlarged head apart, said retainer thus being biased toward the outer end of said connecting rod means, stop means between the bottom of said cup-shaped retainer and the end of the connecting rod means closer to said second piston for preventing the separation of said connecting rod means and said retainer by said spring, the distance between the second piston and the end of said connecting rod means adjacent said second piston determining the maximum amount of movement of said first piston toward said second piston, said second piston at the end thereof adjacent said connecting rod means being adapted to have a portion thereof removed to increase the maximum amount of movement of said first piston toward said second piston, a second spring between said second piston and the inner end of said bore biasing said second piston toward and into engagement with said retainer, a first stop located adjacent the outer end of said bore and providing a positive stop for said piston, a second stop extending from one of said reservoirs into said bore, said second stop being adapted to prevent movement of said second piston out of said bore beyond a predetermined point, said second stop comprising a threaded member having a threaded portion and a shank portion of smaller diameter than said threaded portion extending from one end of said threaded portion, a head on the other end of said threaded portion, a shoulder between said shank portion and said threaded portion, a second bore in said body extending from said second reservoir to said first bore, said second stop passing through said second bore, said second bore having a threaded portion in which said threaded portion of said second stop is threadingly engaged, a shoulder portion against which said shoulder of said second stop is seated and a portion having a diameter sufficiently greater than the diameter of said shank portion to provide a space therebetween, the length of said second stop from said shoulder thereon to said head thereon being greater than the distance between said shoulder portion in said second bore and the end of said second bore which opens into said second reservoir.

* * * * *